Oct. 13, 1964    H. TANKUS ETAL    3,152,808
ROTARY SEAL WITH WEDGE SEALING ELEMENT
Filed Nov. 20, 1959
FIG. 1
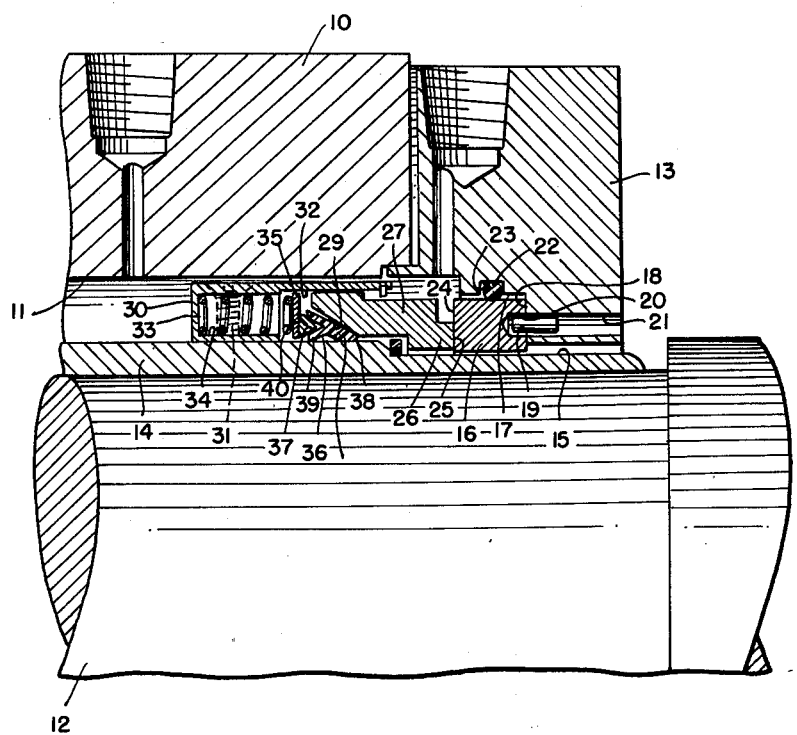
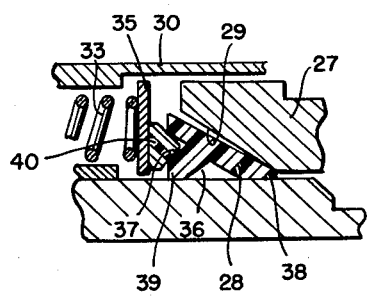
FIG.2
INVENTORS
HARRY TANKUS
VANCE E. VORHEES
BY Charles P. Vrytech
ATT'YS

3,152,808
ROTARY SEAL WITH WEDGE SEALING ELEMENT

Harry Tankus, Wilmette, and Vance E. Vorhees, Prospect Heights, Ill., assignors to Crane Packing Company, Morton Grove, Ill., a corporation of Illinois
Filed Nov. 20, 1959, Ser. No. 854,331
1 Claim. (Cl. 277—84)

This invention relates to rotary mechanical seals which utilize a wedge-shaped sealing element between the sealing washer and the support for the washer to effect a fluid-tight seal therebetween.

For higher temperature conditions it has been proposed to use polytetrafluoroethylene as a sealing material between the rigid sealing washer of the seal and the shaft with which the washer rotates. This material is relatively rigid, but is nevertheless distortable upon the application thereto of moderate pressures. Thus the pressures normally tolerated between the relatively rotating sealing washer and the stationary seat against which it bears are sufficient to distort the material to cause it to conform to the surfaces being sealed.

The distortability of polytetrafluoroethylene however is an inverse function of its thickness, and to obtain satisfactory distortion for conformance to the surfaces to be sealed, the material must be formed with a lip at the sealing point. In prior designs the lip was formed by shaping the material into an endless ring of triangular radial cross section which was wedged into an annular opening having walls slightly diverging with reference to the tapered walls of the ring. This provided slightly more than line contact between the sealing material and the surfaces between which it was wedged. This degree of contact under extreme conditions of vibration was found to be insufficient to maintain a fluid-tight seal.

An object of this invention is the provision of a sealing element of relatively rigid material such as polytetrafluoroethylene for a rotary mechanical seal or the like, wherein at least two distortable sealing lips are formed for the purpose of providing two sealing points between the sealing element and one of the members of a rotary shaft seal.

Another object of this invention seeks to provide a wedge-type sealing element for use between a sealing washer and a shaft with which it rotates, wherein two spaced distortable lips are formed in the sealing element for contact with the shaft to provide a better seal therebetween.

A more specific object of this invention has within its purview the provision of a wedge type sealing element for use between a sealing washer and a shaft with which it rotates, wherein a single pressure element acting upon the sealing element is effective to cause two spaced lips on the sealing element to seal against the shaft.

These and other objects of this invention will become apparent from the following detailed description when taken together with the accompanying drawings in which:

FIG. 1 is a longitudinal section through a seal made in accordance with this invention and showing the seal in a typical environment, and FIG. 2 is an enlarged view of the polytetrafluoroethylene ring, in section, and the adjacent seal parts.

Referring now to the drawings for a detailed description of this invention there is shown a fragment of a housing 10 having an opening 11 thereinto through which extends a shaft 12 for driving an impeller or the like (not shown). A closure plate 13 is secured to housing 10 and extends radially inwardly toward shaft 12 partially to close opening 11.

In the example selected to illustrate this invention the pressure of the fluid to be sealed is in excess of 400 pounds per square inch, and the temperature of the fluid may reach 450° F. With such pressures it is desirable to use a balanced seal and accordingly, shaft 12 is provided with a sleeve 14 which is secured thereto by any suitable means (not shown) preferably providing a sealed connection with the shaft to avoid leakage of the sealed liquid between the sleeve and shaft to the exterior of the housing. Said sleeve has a step 15 of reduced diameter formed on the outer end thereof to permit the use of a stepped and balanced sealing washer hereinafter to be described. It may be appreciated, however, that this invention is not limited in its application to high pressure seals and may accordingly be used successfully with unbalanced seals.

The opening between sleeve 14 and closure plate 13 is sealed in part by a seal seat ring 16 which is received in a recess 17 formed in closure plate 13, and bears directly axially against the bottom surface 18 of said recess. A pin 19 is pressed into opening 21 in plate 13 and extends into a slightly larger opening 20 in ring 16 to hold ring 16 against rotation relative to plate 13. A suitable packing such as an O ring 22 encircling ring 16 and compressed thereby into a groove 23 in closure plate 13, serves to provide a fluid-tight connection between the ring and plate.

The inner radial surface 24 of ring 16 is preferably lapped flat and smooth and forms one of the running faces of the seal. The other running face is shown at 25 and is formed on the nose portion 26 of a sealing washer 27 which encircles sleeve 14 and extends axially into opening 11. Said running face 25 is also lapped flat and smooth to effect a fluid-tight seal between washer 27 and ring 16. Washer 27 is in turn sealed with respect to sleeve 14 by a wedge-shaped endless ring 28 preferably made from polytetrafluoroethylene because of the ability of this material to withstand the relatively high temperatures involved. Said ring 28 is received in a frusto-conical recess 29, formed in the inner end of washer 27 adjacent sleeve 14. A retainer 30 of ring form is disposed over sleeve 14 and is firmly secured thereto by any suitable means such as one or more set screws shown in dotted outline at 31. The forward end of the retainer has a recess 32 into which washer 27 extends.

Wedge-shaped ring 28 is urged axially into frusto-conical recess 29 by a plurality of helical springs 33 located in individual spring recesses 34 formed in retainer 30 and bearing against a washer 35 which equalizes the pressure exerted by the several springs. It may be understood that the springs 33 may be replaced by other well known resilient means without departing from the spirit of this invention.

Polytetrafluoroethylene is a thermoplastic material which is flexible when formed with a relatively thin cross section. In the seal designed herein disclosed, the seal between the washer 27 and the sleeve 14 is effected by forcing a wedge-shaped polytetrafluoroethylene ring into a similarly wedge-shaped recess, the cone-angle of which is different from that of the wedge ring so that line contact is established between the washer and ring, thereby providing a concentrated force upon the ring to distort it into conformance with the surface of the sleeve. Where a substantially triangular radial section is used in the ring, the material of the ring becomes too thick for the ring to be distorted by the spring pressures normally used in seals. Increasing the spring pressure is not desirable because the increased pressure would be transmitted directly to the washer 27 and would produce excessive heat and wear of the running faces 24, 25.

According to the present invention, the radial cross section of the wedge ring is altered by forming a groove 36 in the side adjacent sleeve 14 and a second groove 37 in the side adjacent washer 35. This configuration retains unaltered the apex 38 which is wedged between ring 27 and sleeve 14, and forms a secondary flexible apex 39 which is used to provide a secondary seal between washer 27 and sleeve 14. Said secondary seal may be relied upon to maintain a leak-proof connection between wedge ring 28 and sleeve 14 in the event that the joint between apex 38 and sleeve 14 should fail to hold the fluid.

To insure firm sealing contact between secondary apex 39 and sleeve 14 a hard wedge ring 40 is interposed in groove 37 between washer 35 and wedge ring 28, the wedge angle of ring 40 being greater than the angle between the sides of groove 37 so that axial pressure exerted upon ring 40 will tend to spread the sides of groove 37. This will cause secondary apex 39 to be deflected radially inwardly against sleeve 14 into firm sealing contact therewith. The material of ring 40 may be metal in view of the relatively high temperature encountered in the example illustrated herein. Where lower temperatures are involved, the ring may be molded from any well-known thermo-setting plastic material.

It may be noted that the outside diameter of nose 26 has been reduced with respect to the diameter of sleeve 14 at the location of wedge ring 28 and hence a greater portion of the fluid pressure acting axially upon washer 27 in the direction of seat ring 16 is balanced by fluid pressure acting axially upon washer 27 in the opposite direction and hence the total pressure exerted by washer 27 upon ring 16 is correspondingly reduced. It is not essential, however, to the operation of the wedge ring 28 that washer 27 be balanced.

To avoid having wedge ring 28 rotate relative to washer 27, or sleeve 14 rotate relative to wedge ring 28, an axially slidable driving connection may be provided between wedge ring 28 and the forward part 32 of retainer 30. Such connections are known to those skilled in the art and hence will not be described and illustrated here.

In operation, rotation of shaft 12 and sleeve 14 will cause rotation of retainer 30, washer 27 and wedge ring 28. Any tendency of wedge ring 28 to expand due to centrifugal force will be counteracted by the axial force exerted by the fluid upon said ring 28, augmented to some extent by the pressure of the springs 33, both of which force ring 28 against frusto-conical surface 29, which in turn deflects the apex 38 radially inwardly against sleeve 14. The presence of groove 36 results in greater flexibility in apex 38 and also provides the secondary seal at 39 as aforesaid. Thus the effectiveness of the seal is greatly enhanced over the solid, unrelieved form heretofore proposed.

Although this invention has been described with reference to its application to wedge rings made of polytetrafluoroethylene, it is understood that it may be applied generally to other materials which are relatively stiff in the proportions and under the pressures encountered in seals except when reduced in cross section. The scope of this invention therefore is not to be limited to the example herein illustrated, but it is to be determined by the appended claims.

We claim:

A sealing device for effecting a seal between an annular seat having a radially disposed surface, and a shaft encircled by said seat, said sealing device comprising a washer encircling the shaft and having a radially disposed surface in sealing contact with the radially disposed surface of the seat, and a ring of polytetrafluoroethylene adapted to engage the washer and shaft to provide a fluid-tight seal therebetween, said washer having a frusto-conical surface at its inner periphery diverging from the shaft and defining therewith an annular space having a substantially triangular radial cross-section, said ring of polytetrafluoroethylene having a wedge-shaped radial cross-section defined in its outer periphery by a frusto-conical surface, the cone angle of which is less than the cone angle of the said conical surface on the washer, such that substantially line contact is established between the washer and ring at the apex region of the said ring, and the portion of the ring remote from the apex region is substantially free to move radially in the annular space about said apex region, said ring having a generally radially disposed surface remote from said apex region and having further a circumferential groove in its inner periphery facing said shaft and a circumferential groove in said generally radially disposed surface and facing axially away from said washer, said grooves defining between them a portion of said ring having a secondary flexible apex, a rigid wedge ring in the groove in said generally radially disposed surface, the wedge angle of the rigid wedge ring being greater than the angle between the sides of said groove in said radially disposed surface whereby said wedge ring is adapted to bear against the sides of the groove in said radially disposed surface to spread said sides and thus to contract the secondary flexible apex against the shaft to form a second seal between the ring and shaft, spring means bearing against said rigid wedge ring in an axial direction to wedge said rigid wedge ring into said groove in said radially disposed surface, the first mentioned apex region constituting the only fluid-tight sealing contact between the polytetrafluoroethylene ring and the washer, and said spring means supplying an optimum force for effecting sealing contact between the washer and seat while at the same time distorting both the first mentioned and the secondary apex regions into sealing contact with said shaft.

References Cited in the file of this patent

UNITED STATES PATENTS

| | | |
|---|---|---|
| 2,158,297 | Newill et al. | May 16, 1939 |
| 2,288,164 | Katcher | June 30, 1942 |
| 2,365,046 | Bottomley | Dec. 12, 1944 |
| 2,419,588 | Pasco | Apr. 29, 1947 |
| 2,670,973 | Ginther et al. | Mar. 2, 1954 |
| 2,964,340 | Kinzie et al. | Dec. 13, 1960 |